United States Patent Office 3,136,757
Patented June 9, 1964

3,136,757
METHOD FOR PREPARATION OF (3,2-c)-ISOXAZOLES
Piero Donini, Rome, Italy, assignor to Istituto Farmacologico Serono, Rome, Italy
No Drawing. Filed Oct. 21, 1960, Ser. No. 63,979
Claims priority, application Italy July 27, 1960
8 Claims. (Cl. 260—239.55)

This invention refers to a method for preparation of a new cyclo-pentan-phenantrene derivative. In particular, this invention concerns a method for obtention of 17-beta - hydroxy - 17-alpha-methylandrostane-(3,2,-c)-isoxazole, hereafter called andro-isoxazole.

According to the method comprehended by the claims, andro-isoxazole can be obtained by reaction of 2-hydroxymethylen - 17 - alpha - methylandrostane-17-beta-ol-3-one with hydroxylamine hydrochloride in the presence of either alkaline hydrate or an organic base. The reaction can take place both in aqueous and anhydrous environment.

The reaction can be illustrated as follows:

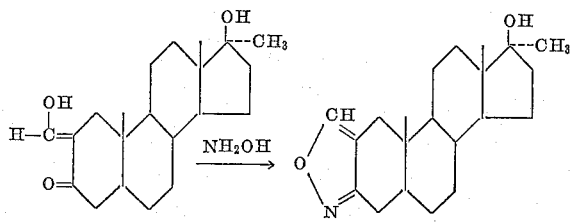

According to the method of the present invention, the reaction of hydroxylamine hydrochloride with 2-hydroxymethylen - 17-alpha-methylandrostane-17-beta-ol-3-one is carried out conveniently in presence of a tertiary base as an acidity-buffering agent, preferably anhydrous pyrine, which can act as a solvent too.

The same reaction can be carried out conveniently about the boiling point of pyridine or another tertiary base used instead of pyridine, with an excess of hydroxylamine hydrochloride corresponding to 50–100% over theoretical requirements.

Use of larger quantities of hydroxylamine results in no particular advantages. At the end of the reaction, the excess tertiary base is removed by distillation and the residue is dissolved in a solvent not mixible with water—preferably ethylether—and the residual pyridine and pyridine hydrochloride formed in the course of reaction is then removed by washing with diluted mineral acids.

The residue obtained after evaporation of the solvent consists of raw andro-isoxazole, M.P. 158° C.

Many processes can be utilized for obtention of pure andro-isoxazole, such as repeated fractional distillation, chromatographic separation or preferably the process based on the treatment of the raw product with an alkaline alcoholate in an ethereal solution. Such an alcoholate is sodium methylate which reacts with the reaction product in a temperature range of 0 to 50° C. for shaking. A preferred temperature range is 20 to 30° C.

Andro-isoxazole, obtained with this preferred method, melts at 163–164° C.

According to another illustrative embodiment of the inventive method, hydrochloric acid released in the reaction of hydroxylamine hydrochloride with 2-hydroxymethylen - 17-alpha - methylandrostane - 17-beta-ol-3-one is buffered by addition of an aqueous solution (Na and K/ hydrate concentration) to the solution of said reagents, preferably in ethanol.

The product obtained from this reaction, isolated according to methods analogous to the aforementioned ones, is depurated with the same processes as above illustrated and preferably by treatment of the raw product in ethereal solution by means of an alkaline alcoholate.

Andro - isoxazole, or 17-beta-hydroxy-17-alpha-ethylandrostane-(3,2-c)-isoxazole thus obtained has proven to be endowed with interesting anabolistic properties with reduced androgenous action, also proving active by mouth.

The following examples illustrate the method practiced in the invention, but these examples are not meant to be limiting.

Example No. 1

10 g. 2-hydroxy-methylen-17-alpha-methylandrostane-17-beta-ol-3-one are dissolved by heating in 40 ml. pyridine. 4 g. hydroxylamine hydrochloride dissolved in 8 ml. water is then slowly added to the solution cooled at 30–35° C.

After boiling for three hours in counter-current apparatus and cooling, about 50% pyridine is distilled at reduced pressure. The syrupy residue thus obtained is dissolved in ethylether and extracted in a separation funnel with about 200 ml. sulfuric acid, 10% concentration. This operation is repeated with sulfuric acid of 10% concentration until all the pyridine is removed, and the ethereal extract is then washed with 5% sodium carbonate solution, and finally with water up to neutrality.

The ethereal extract, dried with anhydrous sodium sulfate, is released from the solvent at first by distillation in the full volume and then by reduced pressure.

The residue obtained is dissolved in 1,000 ml. anhydrous ethylether, and the resulting solution is added to 15 ml. saturated sodium methylate-methanol solution and kept at 20–25° C. for 1 hour.

The ethereal solution is then depurated by filtration from the precipitate formed, repeatedly washed with water, dried with anhydrous sodium sulfate and liberated from the solvent by distillation.

The residue (about 10 g.) is dissolved in 50 ml. warm methanol and boiled in a counter-current apparatus for 10 minutes with 2 g. active carbon. The solution is heat-filtered, and the clear filtrate, cooled at room temperature, is gradually diluted with water up to initial turbidity.

After two crystallisations from methanol, 7.5 to 9 g. of 17 - beta - hydroxy - 17 - alpha-methylandrostane-(3,2-c)-isoxazole, M.P. 163–164° C. (not corrected) is obtained.

The product thus obtained shows specific rotatory activity:

$$D\ alpha^{25°} = +31°$$

with infra-red spectrum (Nujol) showing the following main features: 3430 (m.) cm.$^{-1}$, 1612 (w.) cm.$^{-1}$ Its ultra-violet spectrum shows a $\lambda$ max. (in 95% ethanol) corresponding to 223 m$\mu$: log. $\epsilon$=3.62.

*Analysis.*—for $C_{21}H_{31}NO_2$: Calculated percent: C=76.55; H=9.48; N=4.25. Found percent: C=76.54; H=9.48; N=4.23.

Example No. 2

3.29 g. 2-hydroxymethylen-17-alpha-methylandrostane-17-beta-ol-3-one is dissolved in 35 ml. warm ethanol. The solution is mixed with 1.39 g. hydroxylamine hydrochloride dissolved in 5 cubic cm. water and then 2.4 ml. sodium hydrate, 20% concentration. After boiling for three hours in a counter-current apparatus and cooling, neutralization is carried out with acetic acid, substantially all the ethanol is removed by distillation at reduced pressure and the residue is diluted with about 100 ml. water and repeatedly extracted with ethylether.

The ethereal extracts are washed with water, 5% sodium carbonate aqueous solution and again with water up to neutrality, and then dried with anhydrous sodium sulfate. The solvent is distilled off and the last traces are removed at reduced pressure. The residue is dissolved in about 300 ml. anhydrous ethylether, and 5 ml. saturated sodium methylate-methanol solution is added to the solution. The solution is left at 20–25° C. for 1 hour. The ethereal solution of the precipitate formed is then filtered, repeatedly washed with water, dried with anhydrous sodium sulfate, and the solvent is distilled off.

As illustrated in Example No. 1, the residue is crystallized again from methanol, thus obtaining about 2.5 g. 17-beta - hydroxy - 17-alpha-methylandrostane-(3,2-c)-isoxazol, M.P. 163–164° C. (not corrected).

I claim:

1. The method of preparing 17β-hydroxy-17α-methylandrostane-(3,2-c)-isoxazole which comprises reacting 2-hydroxymethylene - 17α - methylandrostane-17β-ol-3-one with hydroxylamine hydrochloride in the presence of pyridine at a temperature in the range of room temperature to 140° C.

2. The method of preparing 17β-hydroxy-17α-methylandrostane-(3,2-c)-isoxazole which comprises reacting 2-hydroxymethylene - 17α - methylandrostane-17β-ol-3-one with hydroxylamine hydrochloride in the presence of pyridine as an acidity-buffering agent at a temperature in the range of 80° to 120° C.

3. The method as set forth in claim 2, in which the pyridine acts as a reaction solvent as well as an acidity-buffering agent.

4. The method as set forth in claim 2 in which the hydroxylamine hydrochloride utilized in the reaction is 50 to 100% in excess of the theoretical requirement.

5. The method as set forth in claim 2, in which the reaction product is isolated from the solvent and an alkaline alcoholate is added to the reaction product and the purified product obtained by precipitation.

6. The method as set forth in claim 5, in which the alkaline alcoholate is a sodium methylate-methanol solution.

7. The method as set forth in claim 6 in which the temperature range for action between the reaction product and the sodium methylate-methanol solution is between 0° and 50° C.

8. The method as set forth in claim 6, in which the temperature range for action between the reaction product and the sodium methylate-methanol solution is between 20° and 30° C.

References Cited in the file of this patent
FOREIGN PATENTS
580,902    Belgium _____ Jan. 22, 1960